(12) United States Patent
Streetman

(10) Patent No.: US 6,895,816 B2
(45) Date of Patent: May 24, 2005

(54) APPARATUS FOR REMOTELY DETECTING FLUID RESERVOIR LEVELS IN FLUID AND GAS WELL

(76) Inventor: Foy Streetman, P.O. Box 2231, Chickasha, OK (US) 73023-2231

( * ) Notice: Subject to any disclaimer, the term of this patent is extended or adjusted under 35 U.S.C. 154(b) by 159 days.

(21) Appl. No.: 10/454,873

(22) Filed: Jun. 4, 2003

(65) Prior Publication Data

US 2004/0244480 A1 Dec. 9, 2004

(51) Int. Cl.⁷ .............................................. G01F 23/30
(52) U.S. Cl. ........................ 73/305; 73/290 R; 73/291; 137/176; 137/174; 96/15; 96/183; 96/207
(58) Field of Search ...................... 73/290 V; 342/124; 367/140; 340/621

(56) References Cited

U.S. PATENT DOCUMENTS

| | | | | |
|---|---|---|---|---|
| 611,314 A | * | 9/1898 | Cullinan | 137/176 |
| 1,897,398 A | * | 2/1933 | Raymond | 137/174 |
| 2,016,642 A | * | 10/1935 | Abe | 96/185 |
| 2,037,245 A | * | 4/1936 | Leifheit et al. | 96/159 |
| 2,515,202 A | * | 7/1950 | Dyer | 96/207 |
| 2,601,904 A | * | 7/1952 | Erwin | 95/249 |
| 2,701,620 A | * | 2/1955 | Crawford | 96/159 |
| 3,363,404 A | | 1/1968 | Griffin, III et al. | |
| 3,570,532 A | * | 3/1971 | Lendino | 137/558 |
| 3,630,002 A | * | 12/1971 | Burrus | 96/164 |
| 3,980,457 A | * | 9/1976 | Smith | 96/409 |
| 4,355,652 A | * | 10/1982 | Perkins | 137/15.04 |
| 4,968,332 A | * | 11/1990 | Maher | 96/183 |
| 6,164,493 A | * | 12/2000 | Shelton, Jr. | 222/1 |
| 6,456,902 B1 | | 9/2002 | Streetman | |

* cited by examiner

Primary Examiner—Hezron Williams
Assistant Examiner—Katina Wilson
(74) Attorney, Agent, or Firm—R. William Graham

(57) ABSTRACT

An apparatus for detecting fluid levels in an oil and gas well environment and transmitting a signal to a remote site when sensing that the level has reached a predetermined amount.

6 Claims, 1 Drawing Sheet

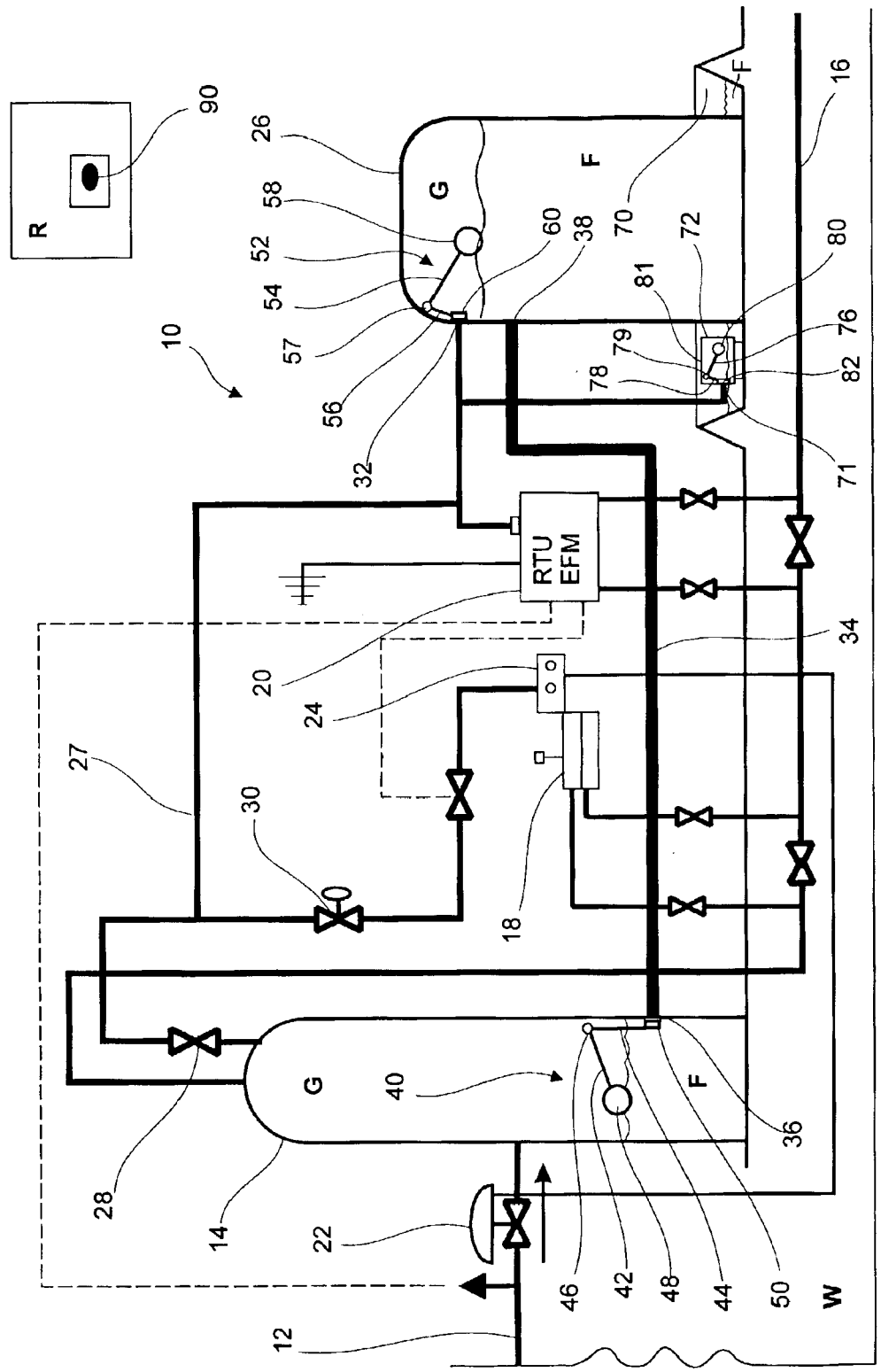

APPARATUS FOR REMOTELY DETECTING FLUID RESERVOIR LEVELS IN FLUID AND GAS WELL

BACKGROUND OF THE INVENTION

1. Field of the Invention

The present invention relates to the remote detection of fluid levels within a confined retainer. More particularly, the invention is directed to an apparatus for detecting fluid levels in an oil and gas well environment and transmitting data to a remote site when sensing that the level has reached a predetermined amount.

2. Related Art

There currently are used a number of storage tanks at well sites. These tanks are used to temporarily store oil pumped from the well until such time as is ready for its removal. Not infrequently, a tank may overflow or leak causing damage to the environment as well as loss of oil. Further, a well is typically connected to various electrical devices which could cause an explosion if subjected to an oil spill. Current regulations require operators to report all spills or leakages of oil, gas, produced water, toxic liquids, or waste materials, blowouts, fires, personal injuries, and fatalities. The operator is under a duty to exercise due diligence in taking necessary measures to assure the well is maintained in a manner to prevent such damage from occurring. Thus, the operator is continuously in need of monitoring the well for such potential leak of storage condition.

Recently, secondary containment systems have been employed in an effort to minimize the potential damage which would occur if the primary containment system leaked or overflowed. While these secondary containment systems are a significant aid in preventing damage from occurring if the primary system fails, there remains a need to improve on the current storage systems.

The present invention meets this need in the art. The invention also provides a way to inform an operator of such conditions at the site.

BRIEF SUMMARY OF THE INVENTION

It is an object to provide safe storage of fluids at an oil and gas well site.

It is another object to improve oil and gas well operation.

It is another object to control well production via a remote control device.

It is an object of the present invention to assure optimal recovery from a well.

It is another object to improve the apparatus for enhancing fluid and gas flow in a well.

It is another object to improve marketing and delivery of fuel and/or power.

Accordingly, the present invention is directed to an apparatus for detecting fluid levels in an oil and gas well environment and transmitting a signal to a remote site when sensing that the level has reached a predetermined amount. The apparatus is operably connected to a well production system having an oil and gas separator which is communicably connected to an oil container. The oil container includes a valve opening which can preferably be in an upper portion of the container.

A float actuated valve is operably disposed inside the upper portion of the container in a manner to permit opening of the valve opening when oil level reaches a predetermined level by virtue of the float being raised due to the oil. When dropping below the predetermined level, the valve opening is closed by virtue of the weight of the float valve.

A pressure conduit is communicably connects the valve opening with a gas pressure supply capable of supplying a predetermined gas pressure within the conduit which is insufficient to move the float valve to open the valve opening. A pneumatic pressure sensor is operably connected to the conduit and senses when pressure drops within the conduit below the predetermined amount due to the float valve being moved by the oil to open the valve opening. The pressure sensor is operatively connected to a transmitting device which is capable of transmitting a signal to a remote site indicative of the container being full and requiring service, i.e., emptying. A remotely located receiving device receives the signal and displays the signal in a manner such that an operator can attend to such service. The transmission can take place using satellite or other communication linking device and can be web enabled.

Another embodiment includes the use of a similar float actuated device which can be employed in an overflow container which likewise operates in a similar manner to enable the transmitting device to send a signal that there is an overflow and/or leak which is occurring and the receiving device receives the signal and displays to the operator the signal in manner which indicates the need for service at the site.

Other objects and advantages will be readily apparent to those skilled in the art upon viewing the drawings and reading the detailed description hereafter.

BRIEF DESCRIPTION OF THE DRAWINGS

FIG. 1 is a schematic diagram of the present invention.

DETAILED DESCRIPTION OF THE INVENTION

Referring to the drawing, the apparatus for detecting fluid levels in a container operatively associated at an oil and gas well site W is generally referred to by the numeral 10. The apparatus 10 is equipped for transmitting data to a remote site when sensing that that a predetermined level in the container has been reached.

In understanding the invention, the well site W includes an upstream flow line 12 communicably interconnecting the well of the well site W to a fluid and gas separator 14 in a manner to receive fluid F and gas G therefrom. A downstream sales flow line 16 communicably connects to the fluid and gas separator 16 in a manner to receive gas G flow therefrom.

A pressure differential controller 18 of the well site W is operably disposed in connection with the downstream sales flow line 16. A well site based controller device 20 is operably disposed adjacent the well site W and includes a communications device for transmitting and receiving signals. The controller device 20 preferably is a CPU having a processor with an associated memory, display, keyboard and a suitable power source. The well site based controller device 20 is housed in a weatherproof container.

A control valve 22 is operably disposed in the upstream flow line 12 and is operably controllably connected to the pressure differential controller device 18 in a manner to permit regulated flow through the upstream flow line 12 at a predetermined amount in response to the sensed pressure differential. The device 18 can employ the use of a controlled transfer valve 24, for example, to open and close the control valve 22. The pressure differential controller device 18 can be used to carry out the function of regulating the supply of gas in the downstream flow line 16. As the pressure differential goes above or below a predetermined threshold range, the pressure differential controller device 18 sends a supply signal to the control valve 22 via a transfer valve 24 causing it to restrict or open accordingly.

A fluid (e.g., oil) storage tank 26 is communicably connected to the separator 14 by a conduit 27 in a manner to receive gas therefrom which is under pressure as regulated by a valves 28 and 30, e.g., fisher 67 FR regulator valves 20 psig. The conduit 27 connects to an open surface (valve opening) 32 which can preferably be in an upper portion of the tank 26. Another conduit 34 communicably interconnects an outlet 36 in a lower portion of the separator 14 and an inlet 38 of the tank 26 which is preferably below the valve opening 32.

A hinged float valve 40 is operably disposed within the separator 14. The float valve 40 has arms 42 and 44 which are rigidly connected at an angle to form a corner 46 which is hingedly connected to an inner wall of the separator 14. Arm 42 has a ball float 48 fixed to its end and arm 44 has a valve cover 50 fixed to its end. The float valve 40 is operably disposed inside the separator 14 in a manner to permit opening of the outlet 36 (valve opening) when the level of the fluid F reaches a predetermined level by virtue of the float 48 being raised due to the fluid F. This permits the fluid F to be transferred to the storage container 26. When the level drops below the predetermined amount, the valve cover 50 closes the outlet 36 by virtue of the weight of the fluid F acting on the cover 50 and the weight of the ball float 48 and arm 46. The angle between the arms 42 and 44 is such that when the valve cover 50 is in a closed position, the float 48 is shown as generally above the outlet 36, but other variations of float valve can be made to accomplish the intended purpose herein.

Another float valve 52 is operably disposed inside the upper portion of the storage container 26. The float valve 52 has arms 54 and 56 which are rigidly connected at an angle to form a corner 57 which is hingedly connected to an inner wall of the container 26. Arm 54 has a ball float 58 fixed to its end and arm 56 has a valve cover 60 fixed to its end. The float valve 52 is operably disposed inside the upper portion of the container 26 in a manner to permit opening of the valve opening 32 when the level of the fluid F reaches a predetermined level (below opening 32) by virtue of the float 58 being raised due to the fluid F thereby permitting the gas G in the conduit 27 to escape into the storage container 26 and thus causing a pressure drop in the conduit 27.

The controller 20 is equipped with a sensor, such as a transducer, which is communicatively linked to a part of conduit 27 and initiates a pressure drop signal which causes the controller 20 to transmit a signal indicative of the container being full and requiring service (i.e., emptying) to a remote site R via the transmitter/receiver device therein. A remotely located receiving device 90 receives the signal and displays the signal in a manner such that an operator can attend to such service. The transmission can take place using satellite or other communication linking device and can be web enabled. Thus, a pneumatic pressure sensor is provided which senses when pressure drops below the predetermined amount due to the float valve 60 opening.

When the level of the fluid F is below the predetermined level in the container 26, the valve cover 60 closes the valve opening 32 by virtue of the weight of the ball float 58 and arm 54 acting on the cover 60 which normally overcomes the pressure of within the conduit 27. The angle between the arms 54 and 56 is such that when the valve cover 60 is in a closed position, the float 58 is generally below the valve opening 32 thus triggering the opening of the valve cover 60 before the level of the fluid F reaches the valve opening 32.

Another embodiment includes the use of a similar float valve device 72 which can be employed in an overflow container 70 surrounding the storage container 26. The device 72 likewise operates in a similar manner to float valve 58 to enable the transmitting device in controller 20 to send a signal that there is an overflow and/or leak which is occurring and the receiving device 90 receives the signal and displays to the operator the signal in manner which indicates the need for service at the site. Here, another part of the conduit 27 terminates in another valve opening 71 within open framework 81 of the device 72 which in turn is disposed in the container 70. The float valve device 72 has arms 76 and 78 which are rigidly connected at an angle to form a corner 79 which is hingedly connected to the open framework 81 of the device 72. Arm 76 has a ball float 80 fixed to its end and arm 78 has a valve cover 82 fixed to its end. The float valve device 72 is operably disposed inside the container 70 in a manner to permit opening of the valve opening 71 when the level of the fluid F reaches a predetermined level (preferably below opening 71) by virtue of the float 80 being raised due to the fluid F thereby permitting the gas G in the conduit 27 to escape and thus causing a pressure drop in the conduit 27.

The controller device 20 has communications software operatively disposed in memory thereof which is operably associated with the receiver and transmitter therein. The controller device 20 also preferably includes controller software resident in the memory thereof for performing a variety of functions and is operably associated with the pressure differential control 18, communications software, processor, control valve 22, receiver and transmitter. For example, functions of the software can include those described in commonly owned U.S. Pat. No. 6,456,902, incorporated herein by reference.

The remote based controller device 90 operably disposed at remote site R includes a communications device, and is preferably a server-client based CPU for enabling web-based clients to access the server CPU. The controller device 90 has a processor, with an associated memory, display and keyboard and a suitable power source. The communications device includes a transmitter and receiver. The controller device 90 has communications software operatively disposed in its memory and is operably associated with the receiver and transmitter. The communications software is complimentary coded to the communications software in the controller 20 to enable communication between therebetween. It is contemplated that communication may take place via radio, satellite, cellular tower or convention land line. Similarly, device 90 functions can include those described in commonly owned U.S. Pat. No. 6,456,902, incorporated herein by reference. It is contemplated in the instant invention, that the controller 20 and/or 90 is equipped to control production flow, i.e., stop production, in the event of an overflow or leak signal being transmitted.

By so providing the present invention, there is provided a safe and reliable way to sense fluid levels in containers at well sites from remote locations. Further, the invention further aids in controlling the well site operation. The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. An apparatus for detecting fluid level in a container disposed at a well and transmitting a signal to a remote site when sensing that the level has reached a predetermined amount, the apparatus including:
   a separator operably disposed at the well for receiving fluid and gas therein and equipped for separating said fluids and gas;
   a storage container having a valve opening;
   a fluids transfer conduit interconnecting said separator and said storage container in a manner to transfer said fluid from said separator to said storage container;
   a gas pressure supply conduit communicably connected to said valve opening for supplying gas pressure at a predetermined amount;
   a float actuated valve operably disposed inside said container in a manner to permit opening of said valve opening when fluid level reaches a predetermined level in said storage container by virtue of said float valve being actuated due to the fluid level exceeding said predetermined level and when dropping below said predetermined level, said valve opening is closed by said float actuated valve preventing gas from said gas pressure supply conduit from passing thereby;
   a pneumatic pressure sensor operably connected to said gas pressure supply conduit for sensing when pressure drops within said gas pressure supply conduit below said predetermined amount due to said float actuated valve being actuated by said fluid to open said valve opening; and
   a transmitting device operatively connected to said pressure sensor and capable of transmitting a signal to a remote site indicative of said storage container being full and requiring service when said pressure sensor senses said pressure drop.

2. The apparatus of claim 1, which further includes a remotely located receiving device for receives said transmitted signal and displays said signal in a manner such that an operator can attend to said service.

3. The apparatus of claim 1, said valve opening is in an upper portion of said container.

4. The apparatus of claim 1, wherein said gas pressure in said gas pressure supply conduit is insufficient without said fluid reaching said predetermined level to actuate said float actuated valve to open said valve opening.

5. The apparatus of claim 1, which further includes a secondary container operably disposed about said storage container, a secondary conduit connecting to said gas pressure supply conduit and having an end extending into said secondary container and having a valve opening, and a secondary float actuated valve operably disposed in said secondary container in a manner to permit opening of said valve opening on said secondary conduit when fluid level reaches a predetermined level in said secondary container by virtue of said float actuated valve being actuated due to fluid level exceeding said predetermined level and when dropping below said predetermined level, said valve opening is closed by said secondary float actuated valve preventing gas from said gas pressure supply conduit from passing thereby, and wherein said pneumatic pressure sensor senses when pressure drops within said gas pressure supply conduit below said predetermined amount due to said secondary float actuated valve being actuated by said fluid to open said valve opening in said secondary container.

6. The apparatus of claim 1, wherein said gas pressure supply conduit connects to said separator to receive gas therefrom.

* * * * *